R. P. PEEPLES.
COMBINED STALK CUTTER AND PLOW.
APPLICATION FILED SEPT. 18, 1908.
929,873.
Patented Aug. 3, 1909.
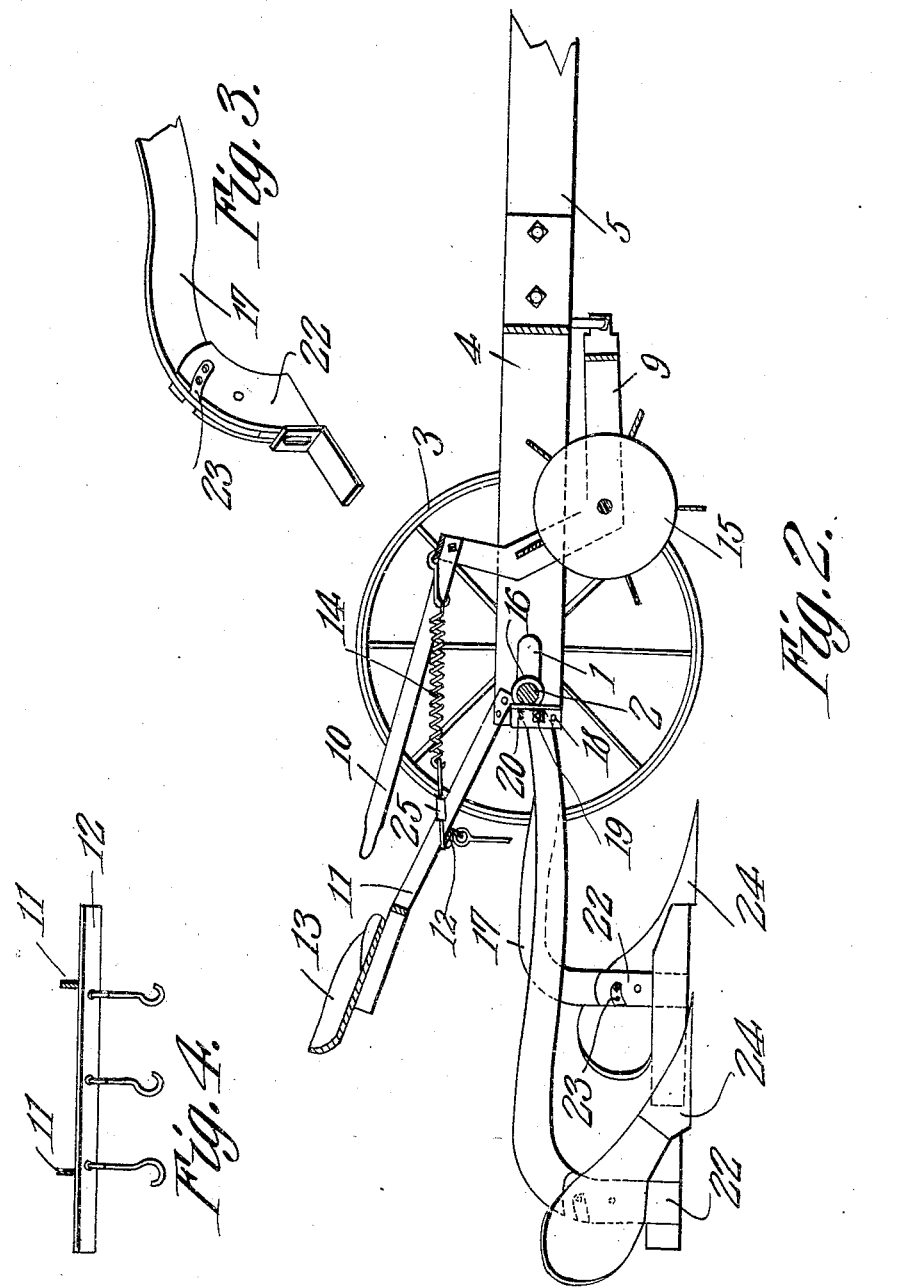
Witnesses
Inventor
Rufus P. Peeples.
By C. A. Snow & Co.
Attorneys

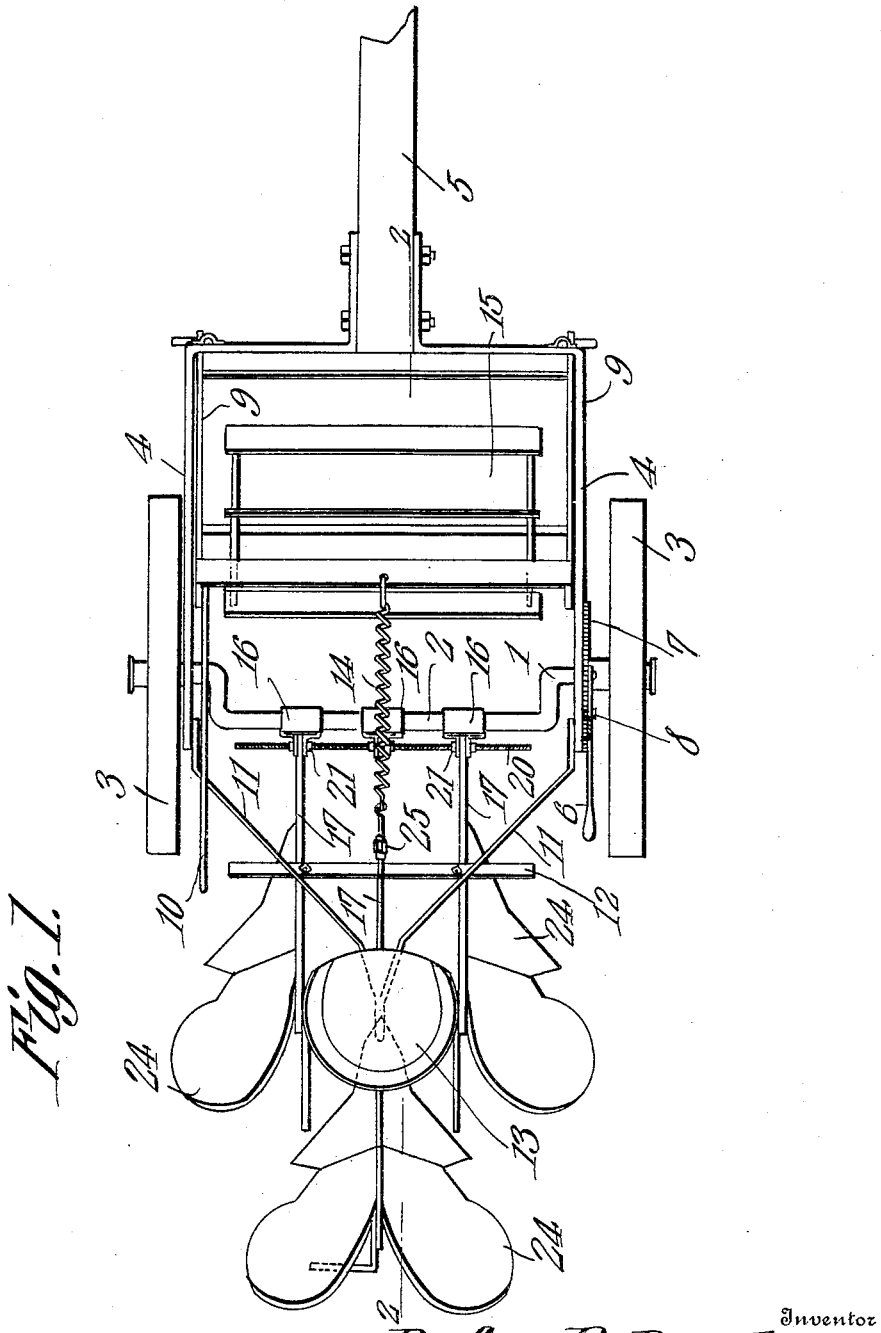

UNITED STATES PATENT OFFICE.

RUFUS P. PEEPLES, OF REAGAN, TEXAS.

COMBINED STALK-CUTTER AND PLOW.

No. 929,873.  Specification of Letters Patent.  Patented Aug. 3, 1909.

Application filed September 18, 1908. Serial No. 453,582.

*To all whom it may concern:*

Be it known that I, RUFUS P. PEEPLES, a citizen of the United States, residing at Reagan, in the county of Falls and State of Texas, have invented a new and useful Combined Stalk-Cutter and Plow, of which the following is a specification.

This invention has relation to combined stalk cutters and plows, and it consists in the novel construction and arrangement of its parts, as hereinafter shown and described.

The object of the invention is to provide a combined implement, as indicated, which embraces an assemblage of a rotary stalk cutter pivotally connected with a wheel mounted frame and a series or gang of plows trailing thereafter and adapted to turn the soil after the stalk cutter has operated upon the same.

With this object in view, the implement consists, primarily, of a wheel mounted axle, which is provided with an intermediate crank portion, to which is pivotally attached a series of plow beams, to each of which is attached a breaking plow. A frame is mounted upon the said axle and is provided at its forward end with a draft tongue. A lever is fixed with relation to one of the end portions of the axle, and is provided with pawl mechanism which engages a segment mounted upon the said frame, and, through the instrumentality of the said lever, the axle may be turned upon its axis, whereby its intermediate crank portion may be elevated or lowered, as desired, for the purpose of presenting the breaking plows at a desired angle to the surface of the soil. A secondary frame is pivotally connected with the forward portion of the first said frame, and a stalk cutter is rotatably mounted in the said secondary frame. Means is provided for raising and lowering the secondary frame with relation to the primary frame, and means is provided for increasing or diminishing the space between the said plow beams. An operator's seat is mounted upon the primary frame, and a tension spring is connected at one end with the primary frame, and at its other end with the secondary frame, and is under tension with a tendency to hold the rotary stalk cutter in contact with the ground.

In the accompanying drawings:—Figure 1 is a plan view of the combined stalk-cutter and plow. Fig. 2 is a longitudinal sectional view of the same. Fig. 3 is a perspective view of one of the rear end portions of one of the plow beams. Fig. 4 is a perspective view of the cross-bar used in the construction of the implement.

The combined stalk-cutter and plow consists of the axle 1, which is provided at its middle or intermediate portion with the crank 2. The supporting wheels 3 are journaled for rotation upon the end portions of the said axle 1. The main or primary frame 4 is mounted upon the end portions of the axle 1, and the draft tongue 5 is connected with the forward end of the said frame 4.

The lever 6 is fixed to one of the end portions of the axle 1, and the gear segment 7 is mounted upon the frame 4, and is concentrically arranged with that end portion of the axle 1 upon which the lever 6 is mounted. The spring pawl 8 is mounted upon the lever 6 and is adapted to engage the gear teeth of the segment 7. The supplemental or secondary frame 9 is pivotally connected at its forward end to the forward end of the primary frame 4. The frame 9 is provided with the rearwardly disposed lever or handle 10. The seat posts 11 are attached to the rear end portion of the frame 4, and are provided, at intermediate points, with the cross-bar 12. The seat 13 is mounted upon the rear ends of the posts 11. One end of the coil spring 14 is attached to the cross-bar 12, and the other end of the said spring is connected with the supplemental frame 9. The spring 14 is under tension, with a tendency to hold the frame 9 down or in a depressed position. The rotary stalk-cutter 15 is journaled for rotation in the supplemental frame 9, and the said stalk-cutter is located in advance of the axle 1.

The sleeves 16 are loosely mounted upon the crank portion 2 of the axle 1, and may turn thereon and move longitudinally along the same. The forward ends of the plow-beams 17 are adjustably connected with the said sleeves 16, each sleeve being provided with a series of perforations 18, which are adapted to receive the bolts 19, which also pass transversely through the forward end portions of the said beams 17. The externally threaded rod 20 passes transversely through all of the beams 17, and the nuts 21 are screw-threaded upon the said rod and bear against opposite sides of the said beams 17. It is obvious that, by turning the said nuts 21, they may be moved along the rod 20, and that the beams 17 may be brought together or spread apart, as desired, inasmuch as said sleeves 16 may move longitudinally along the crank portion 2 of the axle 1. A standard 22 is pivotally connected with the rear end of each of the beams 17, and may be adjusted with relation to the said beams by means of the bolt and slot connection 23. The standard 22 may be of any desired pattern, and may carry any style of plow-point or share 24.

It will be seen that as the implement is drawn along the surface of the ground, the rotary stalk-cutter 15 will engage the stalks and cut the same, and that the plow-share 24 following after will turn the soil and the said cut stalks under. It will also be seen that, as the implement is operating, an operator may swing the lever 6, whereby the axle 1 will be turned upon its axis, and concentrically with the supporting wheels 3. Such movement on the part of the axle 1 will not raise or lower the primary frame 4, inasmuch as the said frame is mounted upon the end portions of the axle; but the intermediate crank portion of the axle 1 will be raised or lowered, and the said portion will carry with it the forward ends of the beams 17. Thus the forward ends of the said beams may be raised or lowered, at will; and by raising and lowering the beams, the shares or plows 24 will be presented at a desired angle with relation to the surface of the soil, and, by reason of the fact that all of the beams 17 are connected with the same crank portion 2, the entire gang of plows is adjusted with relation to the surface of the soil at the same time. After the plows have been adjusted to the desired angle, as described, the pawl 8 is permitted to engage the gear teeth of the segment 7, when the parts will be held in the adjusted position.

By reason of the fact that the secondary frame 9 is connected with the primary frame 10 by means of the spring 14, the stalk-cutter 15 is held in contact with the surface of the soil, but the resiliency or spring of the said connecting member is sufficient to permit the said rotary cutter 15 to ride over obstructions without injury to the parts of the implement. A turn-buckle or other means, such, for instance, as is shown at 25, may be provided upon the spring 14, for increasing or diminishing the tension thereof, as desired. When the implement is turning, at the end of a field or row, the operator may grasp the handle 10, and lift or swing the supplemental frame 9 up, upon its pivotal connection with the primary frame 4, whereby the stalk-cutter 15 will clear the ground, and the implement may be readily turned. When the implement is transported from field to field the beams 17 may be engaged with the hooks carried by the bar 12, whereby the plows will be held in elevated positions above the surface of the ground.

Having described my invention, what I claim as new, and desire to secure, by Letters Patent, is:—

An implement as described comprising an axle having end portions concentrically mounted upon supporting wheels, and an intermediate crank portion, a frame mounted upon the concentric portions of the axle, means for supplying draft to the frame, means for turning the axle upon its axis, a gang of plow beams pivotally mounted upon the crank portion of the axle and deriving draft from the axle only, and means for independently adjusting the plow beams laterally with relation to each other and for securing the beams in adjusted position.

In testimony that I claim the foregoing as my own, I have hereto affixed my signature in the presence of two witnesses.

RUFUS P. PEEPLES.

Witnesses:
D. H. MOORE,
W. P. WINZEE.